United States Patent
Gale et al.

(10) Patent No.: US 8,874,654 B2
(45) Date of Patent: Oct. 28, 2014

(54) SYSTEM FOR PROCESSING REQUESTS TO PORTLETS

(75) Inventors: Martin J Gale, Eastleigh (GB); Ian Hughes, Warsash Southampton (GB)

(73) Assignee: International Business Machines Corporation, Armonk, NY (US)

( * ) Notice: Subject to any disclaimer, the term of this patent is extended or adjusted under 35 U.S.C. 154(b) by 1206 days.

(21) Appl. No.: 11/393,635

(22) Filed: Mar. 30, 2006

(65) Prior Publication Data

US 2006/0235942 A1      Oct. 19, 2006

(30) Foreign Application Priority Data

Apr. 19, 2005   (GB) .................................. 0507801.9

(51) Int. Cl.
  *G06F 15/16*   (2006.01)
  *G06F 9/46*    (2006.01)
  *H04L 29/08*   (2006.01)

(52) U.S. Cl.
  CPC ............ *H04L 67/02* (2013.01); *H04L 67/2838* (2013.01)
  USPC ........................................ 709/205; 718/102

(58) Field of Classification Search
  USPC ....................................................... 709/205
  See application file for complete search history.

(56) References Cited

U.S. PATENT DOCUMENTS

| 6,327,628 | B1 * | 12/2001 | Anuff et al. .................... 719/311 |
| 6,668,353 | B1 * | 12/2003 | Yurkovic ....................... 715/205 |
| 2002/0116511 | A1 * | 8/2002 | Boehme et al. ............... 709/230 |
| 2002/0169852 | A1 * | 11/2002 | Schaeck ........................ 709/218 |
| 2003/0217328 | A1 * | 11/2003 | Agassi et al. ................. 715/500 |
| 2004/0003097 | A1 | 1/2004 | Willis et al. |
| 2004/0205555 | A1 | 10/2004 | Hind et al. |
| 2006/0230021 | A1 * | 10/2006 | Diab et al. ......................... 707/3 |
| 2008/0034369 | A1 * | 2/2008 | Polizzi et al. ................. 718/102 |

FOREIGN PATENT DOCUMENTS

WO    WO02067140    8/2002

* cited by examiner

*Primary Examiner* — David Lazaro
*Assistant Examiner* — Mahran Abu Roumi
(74) *Attorney, Agent, or Firm* — Grasso PLLC; Fred Grasso (57) ABSTRACT

Portlet processing for portal applications aggregating content from sources is provided. This processing may include client intervention and publish/subscribe system use. Topic information used for rendering may be obtained by using a subscription/publisher methodology targeting clients for receipt of the topic information. The topic information from a publish/subscribe system may be inserted into placeholders on a portal page, the placeholders previously created at the client for receipt of the topic information by the client.

18 Claims, 5 Drawing Sheets

```html
<html>
    <head>
        <title>ACME Corporation</title>
    </head>
    <body>

<div id="portlet1">
        <h1>ACME bank account</h1>
        <table>
            <tr>
                <td>Account number:</td>
                <td><input type="text" name="accountno"></td>
                <td colspan="2"><input type="submit"></td>
            </tr>
        </table>
    </div>

<div id="portlet 2">
        <h1>ACME share price</h1>
        <table>
            <tr>
                <td>FTSE</td><td>+1.3</td>
            </tr>
            <tr>
                <td>Nasdaq</td><td>+0.3</td>
            </tr>
        </table>
    </div>

<div id="portlet 3">
        <h1>ACME weather</h1>
        <table>
            <tr>
                <td>London</td><td>17C</td>
            </tr>
        </table>
    </div>

</body>
</html
```

FIG. 3

```
<html>
    <head>
        <title>ACME Corporation</title>

</head>
    <body>

<div id="portlet1">
        <div topic="portlets/1/1234/output">
            <h1>ACME bank account</h1>
            <table>
                <tr>
                    <td>Account</td>
                    <td>One moment please</td>

</tr>
            </table>
        </div>
    </div>

<div id="portlet 2">
            <h1>ACME share price</h1>
            <table>
                <tr>
                    <td>FTSE</td><td>+1.3</td>
                </tr>
                <tr>
                    <td>Nasdaq</td><td>+0.3</td>
                </tr>
            </table>
    </div>

<div id="portlet 3">
            <h1>ACME weather</h1>
            <table>
                <tr>
                    <td>London</td><td>17C</td>
                </tr>
            </table>
    </div>

</body>
</html
```

FIG. 4

```
<html>
    <head>
        <title>ACME Corporation</title>

</head>
    <body>

<div id="portlet1">
        <div topic="portlets/1/1234/output">
            <h1>ACME bank account</h1>
            <table>
                <tr>
                    <td>Account</td>
                    <td>£1500</td>
                    <td>Your request has been
                processed</td>

</tr>
            </table>
        </div>
    </div>

<div id="portlet 2">
            <h1>ACME share price</h1>
            <table>
                <tr>
                    <td>FTSE</td><td>+1.3</td>
                </tr>
                <tr>
                    <td>Nasdaq</td><td>+0.3</td>
                </tr>
            </table>
    </div>

<div id="portlet 3">
            <h1>ACME weather</h1>
            <table>
                <tr>
                    <td>London</td><td>17C</td>
                </tr>
            </table>
    </div>

</body>
</html
```

FIG. 5

SYSTEM FOR PROCESSING REQUESTS TO PORTLETS

FIELD OF THE INVENTION

The present invention relates to a system for processing requests to portlets.

BACKGROUND OF THE INVENTION

The World Wide Web is the Internet's multimedia information retrieval system. In the web environment, client machines communicate with web servers using the Hypertext Transfer Protocol (HTTP). The web servers provide users with access to files such as text, graphics, images, sound, video, etc., using a standard page description language known as Hypertext Markup Language (HTML). HTML provides basic document formatting and allows the developer to specify connections known as hyperlinks to other servers and files. In the Internet paradigm, a network path to a server is identified by a Uniform Resource Locator (URL) having a special syntax for defining a network connection. So called web browsers, for example Netscape Navigator (Netscape Navigator is a registered trademark of Netscape Communications Corporation) or Microsoft Internet Explorer (Microsoft and Internet Explorer are trademarks of Microsoft Corporation), which are applications running on a client machine, enable users to access information by specification of a link via the URL and to navigate between different HTML pages.

When the user of the web browser selects a link, the client machine issues a request to a naming service to map a hostname (in the URL) to a particular network IP (Internet Protocol) address at which the server machine is located. The naming service returns an IP address that can respond to the request. Using the IP address, the web browser establishes a connection to the server machine. If the server machine is available, it returns a web page. To facilitate further navigation within the site, a web page typically includes one or more hypertext references ("HREF") known as "anchors" or "links".

A portal application is typically a web application which aggregates content from various different sources and presents it within a portal web page, and can have personalization features to provide customized content to users. The portal application can provide a gateway to one or more backend software applications and is often provided on a separate portal server.

The portal server typically arranges web content into a portal page containing one or more portlets. A portlet is a web component, managed by a portlet container, which processes and generates dynamic web content. This content, often called a fragment, can be aggregated by the portal application with content from other portlets to form the portal page. The content generated by a portlet may vary from one user to another depending on the user configuration for the portlet.

The portal application provides a navigation framework for a set of web pages arranged on the server in a hierarchy. This framework provides a user interface allowing navigation through the hierarchy of pages that are available on the server. The user interface providing this navigation is known as a theme. Each page may contain zero or more portlets, the page arrangement being predetermined and constructed using design or administration tools.

With a standard server-side portal application, a client web browser is used to view the aggregated output of several portlets on a single page.

Users interact with the portlets causing events to be generated. The portal application receives an event and determines if the event is associated with any of the portlets associated with the portal page. If an event is associated with a portlet on the portal page, the portal application requests the portlet container to invoke that portlet to process the event. Once the portlet has processed the event (in an event processing phase), a rendering phase begins, wherein the portlet generates a content fragment to be included in a new portal page. Additionally, all other portlets on the requested portal page refresh and pass a content fragment to the portal application.

The portal application packages each portlet content fragment in a portlet window adding a title and control buttons to each window. This is sometimes called 'wrapping' each supplied content fragment, and the additional markup used to wrap the content fragment is called a 'skin'. The skin may include control buttons which may be used, for example, to place the portlet into a specific mode such as edit or configure, or to change the display state of the portlet into a maximized or minimized visual state, such as in a common windowing system.

Next, the portal application aggregates the portlet windows into a complete portal page, for sending to the client. The web browser renders the portal page on a display screen of the client.

It should be understood that the event processing phase executed by a portlet can be slow (e.g., if access to remote systems is required, if access to legacy systems is required, etc.). Also, the rendering phase cannot begin until the event processing phase has completed and a portal page for rendering on a client cannot be sent until the rendering phase for all portlets has completed. Thus, the completion time for the entire process (i.e. event processing phase, rendering phase and rendering on the client) is governed by the slowest portlet. This is frustrating for a user because a lengthy time period can pass before the user can view results associated with their request.

One solution to this problem is to use an HTML inline frame (IFRAME) to embed portlet content. An IFRAME has its own URL and can therefore load and be forced to refresh independently of the portal server (and therefore, independently of other portlets). However, a portal application loses control of the portlet whose content is embedded in the IFRAME. Furthermore, currently, support for IFRAMES by browsers is limited.

SUMMARY

According to a first aspect, the present invention provides a system for processing a request to a portlet, for use with an environment comprising a first data processing system having one or more portlets and a publish/subscribe broker. The system comprises: means, responsive to receiving the request, for executing a first component and a second component associated with the portlet, wherein the first component comprises means for generating data comprising a unique topic, wherein the unique topic is associated with the portlet; and wherein the second component is executable in parallel to the first component and comprises means for publishing results associated with the request to the unique topic at the broker.

Preferably, the data further comprises a content fragment, wherein the content fragment is generated by the portlet. More preferably, the system further comprises means, responsive to generation of the content fragment, for aggregating the data into a portal page and means for sending the portal page to a second data processing system. Still more preferably, unique topic is associated with the content fragment. Still more preferably, the system further comprises means for generating the unique topic.

According to a second aspect, the present invention provides a system for receiving results associated with a request to a portlet for use with an environment comprising a data processing system having one or more portlets and a publish/subscribe broker. The system comprises: means, for sending a request to the portlet, means, responsive to receiving data comprising a unique topic, wherein the unique topic is associated with the portlet, for subscribing at the broker to the unique topic; and means for receiving results associated with the request, through the subscription, wherein the results are published to the unique topic at the broker.

Preferably, the data further comprises a content fragment, wherein the content fragment is generated by the portlet. More preferably, the system further comprises means, responsive to receiving a portal page comprising the data, for rendering the portal page. Still more preferably, the unique topic is associated with the content fragment. Still more preferably, the system further comprises means, responsive to receiving the results, for re-rendering the portal page with the results.

According to a third aspect, the present invention provides a system, comprising: a network; a first data processing system having one or more portlets, a publish/subscribe broker; a system for processing a request to a portlet as described above and a system for receiving results associated with a request to a portlet as described above.

According to a fourth aspect, the present invention provides a method for processing a request to a portlet, for use with an environment comprising a first data processing system having one or more portlets and a publish/subscribe broker. The method comprises the steps of: in response to receiving the request, executing a first component and a second component associated with the portlet, wherein the first component generates data comprising a unique topic, wherein the unique topic is associated with the portlet; and wherein the second component is executable in parallel to the first component and publishes results associated with the request to the unique topic at the broker.

According to a fifth aspect, the present invention provides a computer program comprising program code means adapted to perform all the steps of the method described above when said program is run on a computer.

According to a sixth aspect, the present invention provides a method for receiving results associated with a request to a portlet for use with an environment comprising a data processing system having one or more portlets and a publish/subscribe broker. The method comprises the steps of: sending a request to the portlet, in response to receiving data comprising a unique topic, wherein the unique topic is associated with the portlet, subscribing at the broker to the unique topic; and receiving results associated with the request, through the subscription, wherein the results are published to the unique topic at the broker.

According to a seventh aspect, the present invention provides a computer program comprising program code means adapted to perform all the steps of the method described above when said program is run on a computer.

Advantageously, the unique topic associated with a portlet provides a placeholder on the portal page into which the results from a user request are eventually placed. This ensures that the results are incorporated into the correct position in the portal page.

BRIEF DESCRIPTION OF THE DRAWINGS

The present invention will now be described, by way of example only, with reference to preferred embodiments thereof, as illustrated in the following drawings, wherein.

DETAILED DESCRIPTION

Figure 1:
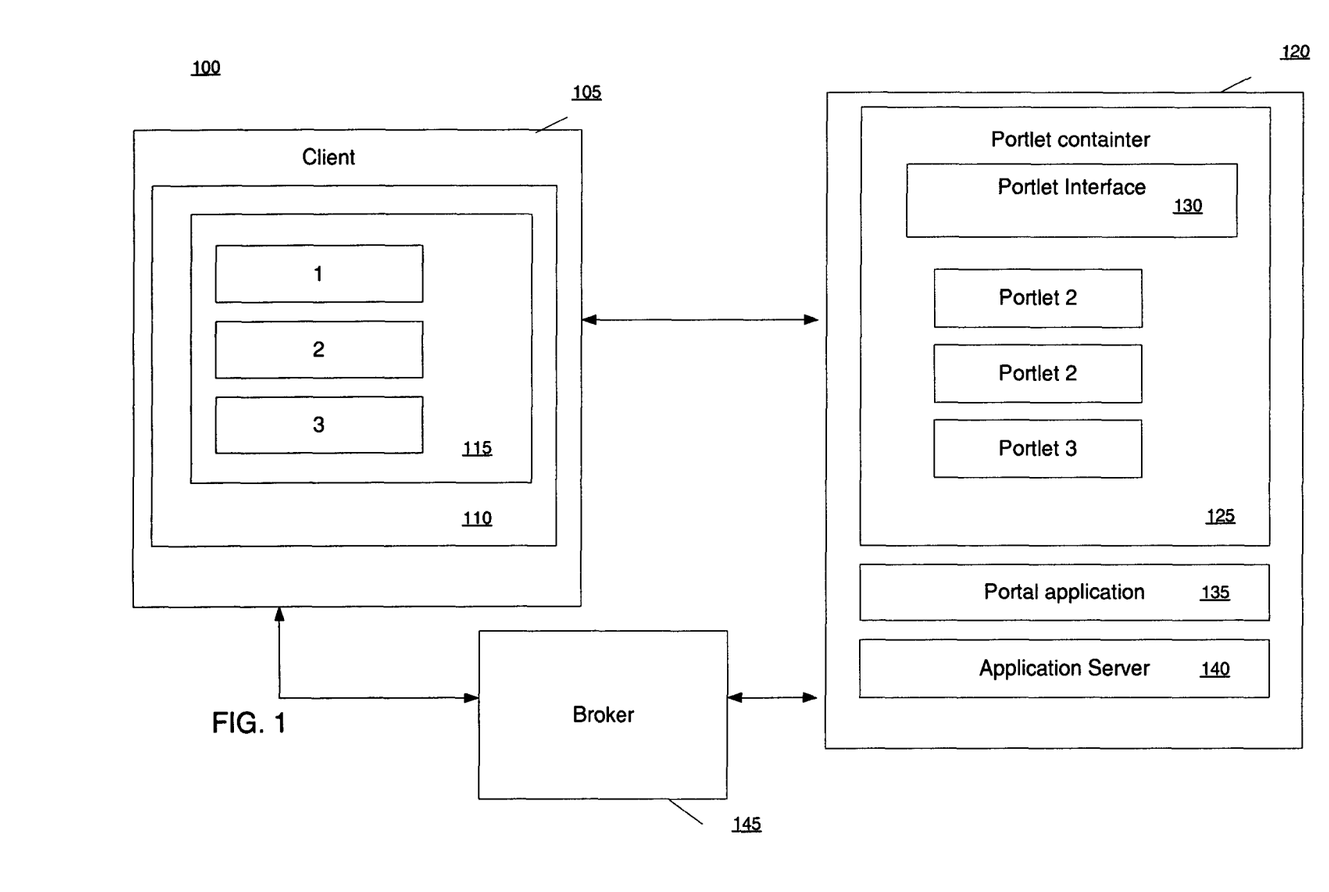
FIG. 1 is a block diagram of a system in which the present invention may be implemented.

With reference to FIG. 1, there is shown a block diagram of a system (100) in which the present invention may be implemented. There is shown a client computer system (105) having a web browser (110) on which a user can view a portal page (115) displaying the output of a number of portlets in a number of portlet windows (i.e. 1, 2 and 3).

There is also shown a server computer system (120) having a portal application (135) hosted by an application server (140) (e.g. WebSphere Application Server, Websphere is a registered trademark of International Business Machines Corporation). The server computer system (120) also comprises a portlet container (125), which controls portlets and provides services for them to interact with other applications or platforms. That is, the portlet container (125) provides a runtime environment for portlets (i.e. Portlet 1, Portlet 2 and Portlet 3). The portlet container (125) comprises a portlet application interface (API) (130), which provides an interface for portlet functions.

In a first example, Portlet 1, Portlet 2 and Portlet 3 contribute content fragments to a portal page. Typically, a portal page is constructed in a markup language (e.g. HTML) and the portlets are developed in Java (Java and all Java-based trademarks are trademarks of Sun Microsystems, Inc. in the United States, other countries, or both).

There is also shown a message broker (145) for use in a publish/subscribe (pub/sub) system. In a pub/sub system, publishers are typically not concerned with where their messages are going, and subscribers are typically not interested in where the messages they receive have come from. Instead, a message broker typically assures the integrity of the message source and manages the distribution of a message according to subscriptions registered in the message broker. Message topics typically provide the key to the delivery of messages between publishers and subscribers. The message broker attempts to match a topic string on a published message with a list of clients who have subscribed to receive publications including that topic string.

Figure 2:
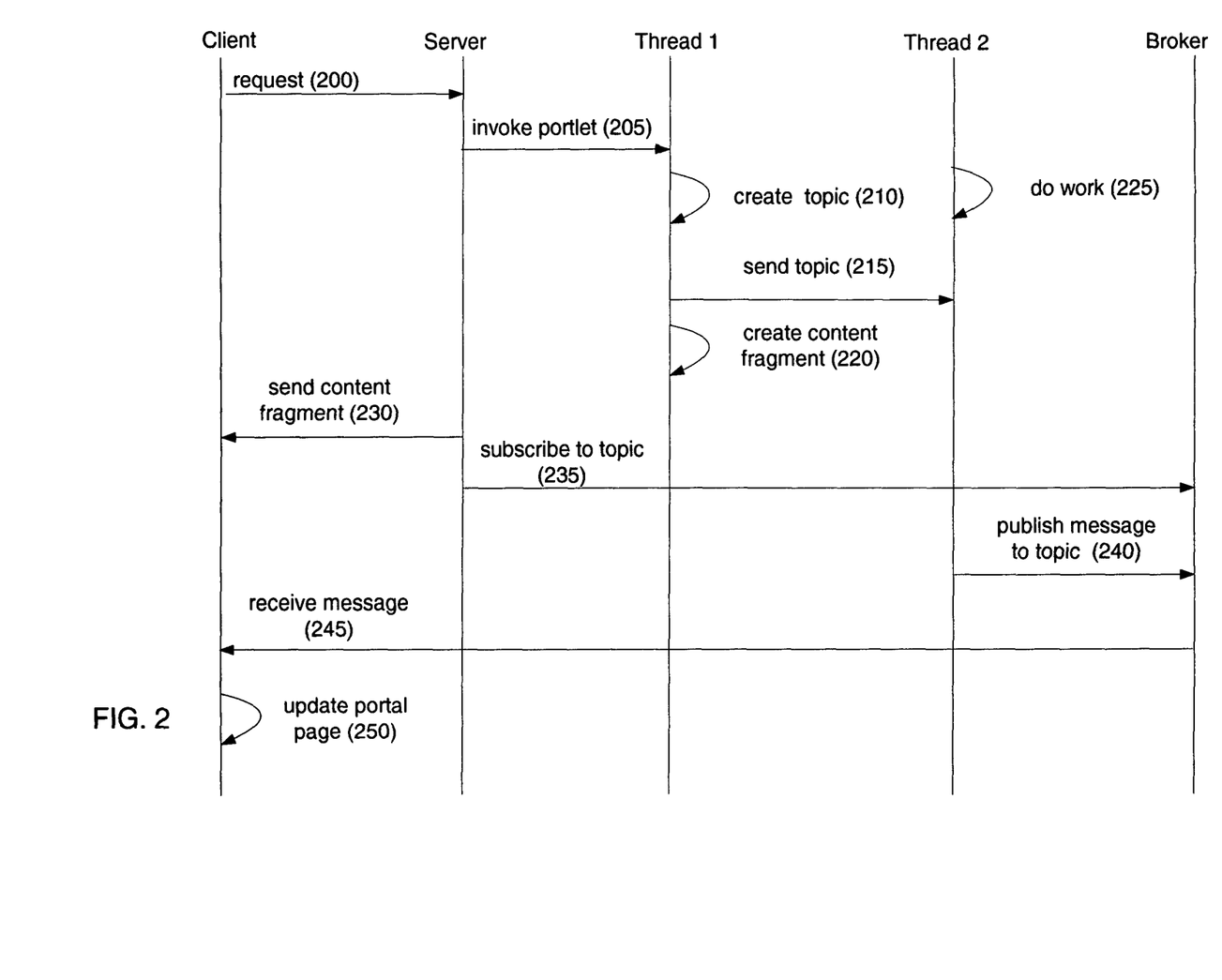
FIG. 2 is a schematic diagram of components in the system of FIG. 1 and the flows between those components.

FIG. 2 is a schematic diagram of a plurality of components of the system (100) of FIG. 1 and the flows between those components. In step 200, a user invokes a request via the web browser (110) against content associated with a portlet. The request is associated with a portlet event. Portlet events can be actions (that are typically associated with URLs), messages (wherein a message can be sent from one portlet to another portlet in the same portlet application, wherein a portlet application comprises one or more portlets) or window events (triggered by a user actioning control buttons that change the state of a window associated with a portlet—e.g. minimizing the window).

As described above, in response to a request, a portlet typically executes two main phases: an event processing phase and a rendering phase. The event processing phase is called against the specific portlet that has been targeted by the request. The event is then processed, after which, the state of the portlet is committed. Next, the rendering phase is called for all the portlets that contribute to a portal page, causing all the portlets to produce content fragments. The content fragments generated in the rendering phase can be associated with the portlet mode (e.g. view, edit or help). For example, if a portlet has a view mode, the content fragments generated are based on the portlet's current state.

Figure 3:
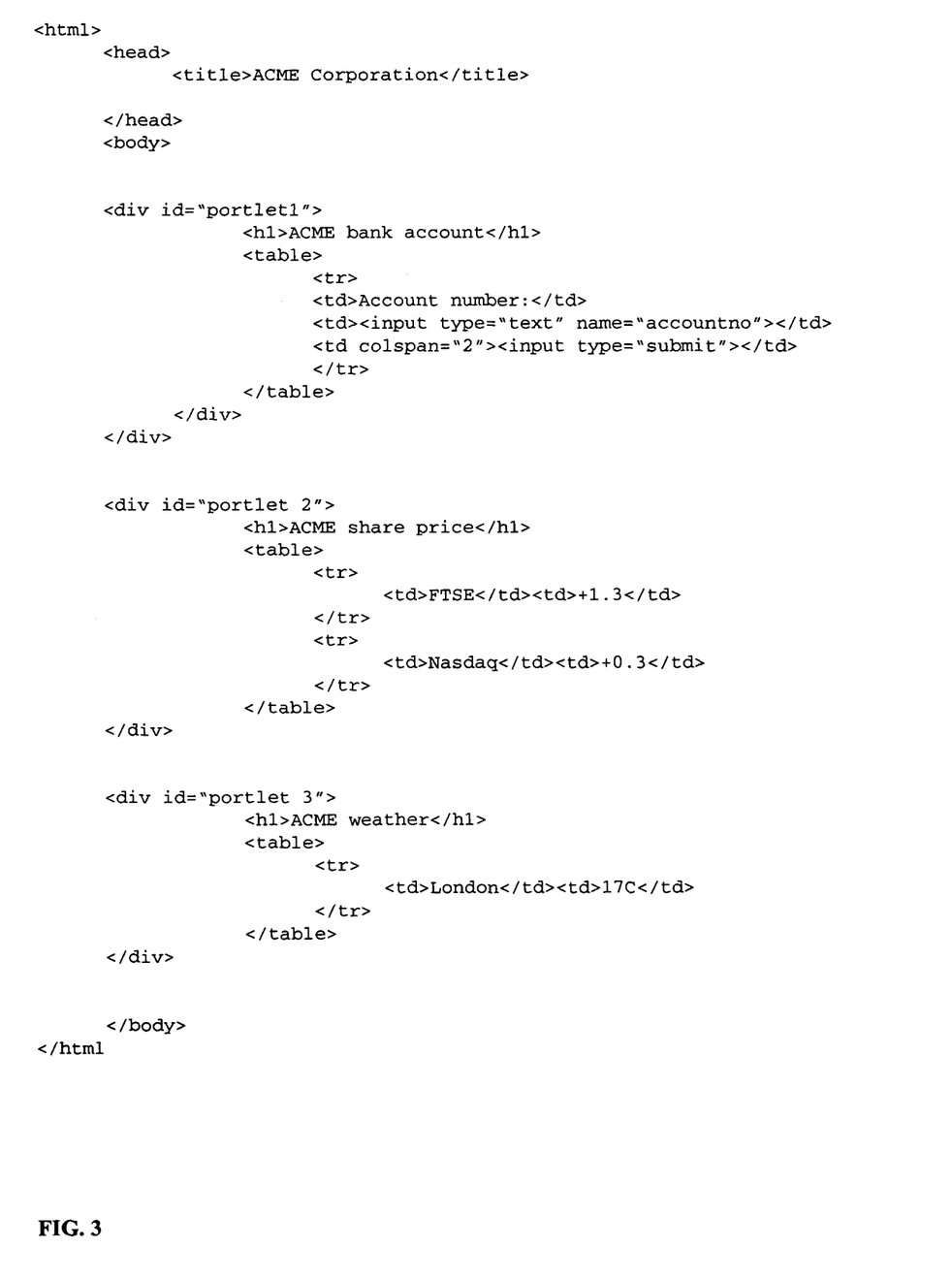
FIG. 3 is an example of a portal page following a user request.

In a first example, a request from a user to obtain bank account details from a legacy system generates an action event. In a first example, the request is invoked against content associated with Portlet 1 and the action comprises a click of a button in a form. The resulting state of the portal page is shown in FIG. 3. It should be understood that FIG. 3 shows a very simple example of a portal page, for clarity purposes. It should be understood that a portal page would typically also comprise markup associated with portlet windows, control buttons, etc.

The portal page comprises a header (denoted by the <head> </head> tags) and a body (denoted by the <body> </body> tags). The header comprises a title (i.e. ACME Corporation). The body comprises content fragments associated with the portlets (i.e. Portlet 1, Portlet 2 and Portlet 3), for example, headers, text, numerals, etc. The portion below associated with Portlet 1, represents the request:

```
<td>Account number:</td>
<td><input type="text" name="accountno"></td>
<td colspan="2"><input type="submit"></td>
```

The request is sent (200) to the server computer system (120). When the request is received by the server computer system (120), the portal application (135) determines whether the request is targeted to any of the portlets associated with the portal page. In this example, the request is targeted to a portlet associated with the portal page, namely, Portlet 1. Next, the portal application (135) requests the portlet container (120) to invoke (step 205) an instance of Portlet 1.

In response to an instance of Portlet 1 being invoked by the portlet container (120), an event is sent to Portlet 1, which receives the event by implementing an event listener. The event can be used to get data associated with the request and the portlet action, so that Portlet 1 can use the data to process the request.

Next, according to the present invention, an execute component (not shown) executes two threads associated with Portlet 1, namely Thread 1 and Thread 2. A thread is a program function. Thread 1 is responsible for completing the event processing phase. Thread 2 is responsible for processing the user request. Thread 1 and Thread 2 are executable in parallel.

The processing executed by Thread 1 will now be described. Firstly, Thread 1 creates a unique identifier associated with Portlet 1. One way in which a unique identifier can be created is to use a hash function. It should be understood that the creation of unique identifiers is well known in the art and will not be discussed further. In the first example, the unique identifier is "1234".

Next, Thread 1 creates (step 210) a topic associated with Portlet 1, wherein preferably, the topic comprises the unique identifier. An example of a topic structure is shown below:

portlets/<portlet name>/<portlet identifier>/output

Using the topic structure above, Thread 1 creates the following topic:

portlets/1/1234/output

Next, Thread 1 sends (step 215) the topic to Thread 2.

It should be understood that, in an alternative embodiment, a unique topic can be generated by a component that is separate to Thread 1.

Thread 1 then generates data. Preferably, the data is a "container tag", that is, a tag that can comprise further data e.g. other tags and text. In the first example, the container tag is a <DIV> tag. Another example of a container tag is a table tag.

An example of a <DIV> tag is shown below, wherein the <DIV> tag (i.e. the data) "contains" the generated topic (i.e. portlets/1/1234/output) and some text (i.e. "One moment please"):

<div topic="portlets/1/1234/output">One moment please . . . </div>

It should be understood that the data generated can be generated and returned before the topic is sent to Thread 2. In the first example, after generation of the data, the event processing phase completes.

Next, the rendering phase begins, wherein the portlet container calls a render method on all portlets in the portal page (i.e. Portlet 1, Portlet 2 and Portlet 3). As output to the render method, each portlet provides a content fragment. The content fragment provided (step 220) by Portlet 1 comprises the data (i.e. <div topic="portlets/1/1234/output">One moment please . . . </div>). The content fragment provided by Portlet 1 is shown below:

```
<div id="portlet1">
    <div topic="portlets/1/1234/output">
        <h1>ACME bank account</h1>
        <table>
            <tr>
                <td>Account</td>
                <td>£1500</td>
                <td>One moment please</td>
            </tr>
        </table>
    </div>
</div>
```

The content fragment provided by Portlet 2 is shown below:

```
<div id="portlet 2">
    <h1>ACME share price</h1>
    <table>
        <tr>
            <td>FTSE</td><td>+1.3</td>
        </tr>
        <tr>
            <td>Nasdaq</td><td>+0.3</td>
        </tr>
    </table>
</div>
```

The content fragment provided by Portlet 3 is shown below:

```
<div id="portlet 3">
    <h1>ACME weather</h1>
    <table>
        <tr>
```

-continued

```
            <td>London</td><td>17C</td>
        </tr>
    </table>
</div>
```

Once the render method on all portlets has completed, the portlet container (125) provides the content fragments to the portal application (135) and returns control to the portal application (135).

Figure 4:
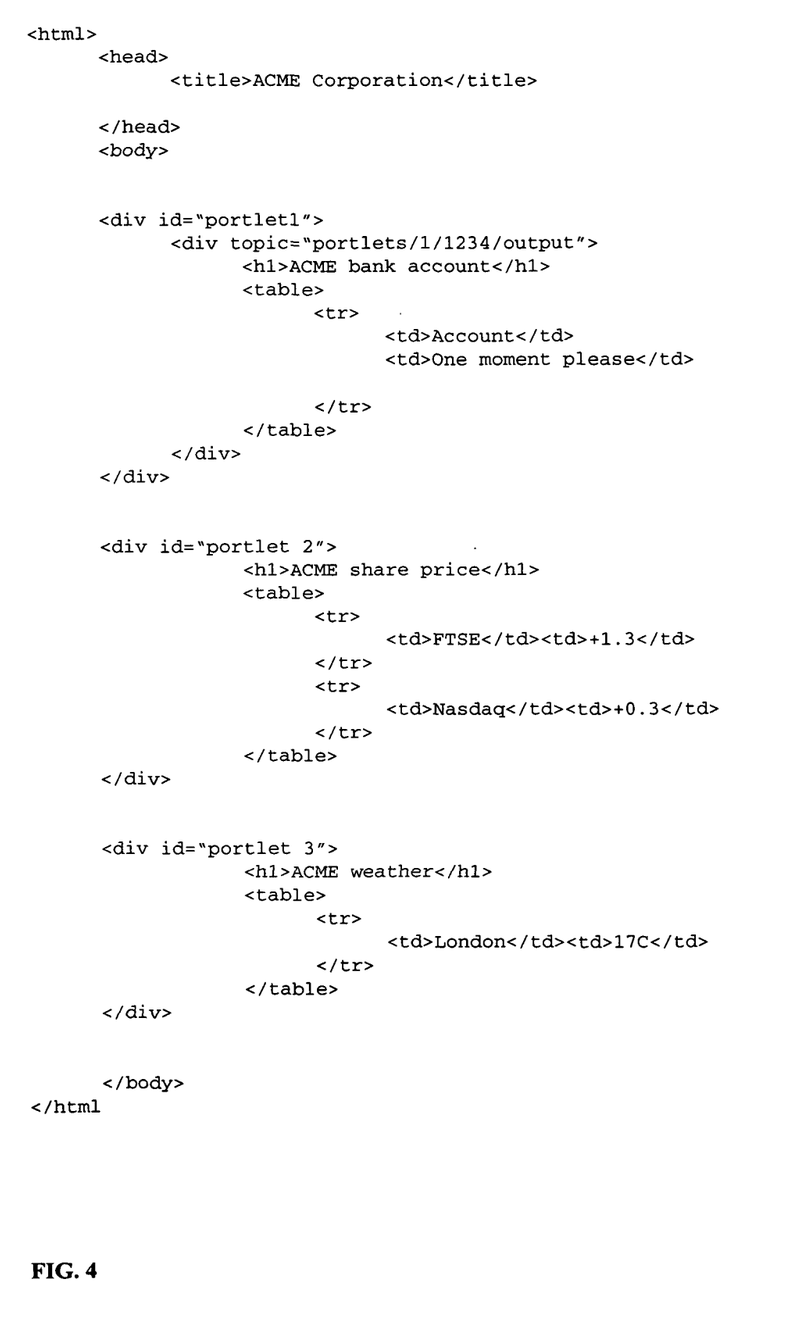
FIG. 4 is an example of a portal page following a rendering phase.

The portal application (135) aggregates the content fragments and constructs a portal page, which is sent (step 230) by the portal application (135) to the client computer system (105). An example of the portal page is shown in FIG. 4.

In response to the portal page being received at the client computer system (105), a third thread (i.e. Thread 3) is executed within the web browser (110). It should be understood that the third thread can also be executed elsewhere on the client computer system (105) or on another computer system associated with the client computer system (105).

Thread 3 parses the received portal page for data associated with one or more topics. In the first example, Thread 3 parses for a field comprising the word "topic". In response to finding the field comprising the word "topic", Thread 3 reads the field and determines that the topic is "portlets/1/1234/output". Next, Thread 3 creates (step 235) a subscription for the web browser (110) at the broker (145), registering an interest in the topic that was found.

A description of the processing executed by Thread 2 will now be described. In the first example, in order to process (step 225) the user request, Thread 2 gains access to a legacy system holding storing details relating to the user's bank account and requests the details. It should be understood that security functions such as authentication of Thread 2 to the legacy system can be implemented. In response to receiving the request for the details from Thread 2, the legacy system executes processing to find and return the details to Thread 2. It should be understood that processes which execute on legacy systems are typically slow. Optionally, in response to receiving the results, Thread 2 performs a transformation of the results received from the legacy system, into a format accepted by the broker (145). In an alternative embodiment, the broker (145) transforms the results into a format accepted by the subscriber (i.e. the web browser (110)).

In response to receiving the results, Thread 2 publishes (step 240) the results in a message to the broker (145) against the topic "portlets/1/1234/output" (wherein Thread 1 sends the topic to Thread 2 at step 215. It should be understood that if a unique topic is generated by a component that is separate to Thread 1, Thread 2 receives the topic from the component). An example of the message is shown below:

```
<h1>ACME bank account</h1>
<table>
    <tr>
        <td>Account</td>
        <td>£1500</td>
        <td>Your request has been processed</td>
    </tr>
</table>
```

In response to publication of the message, the broker (145) sends the message to registered subscribers (i.e., the web browser (110)). In response to the web browser (110) receiving (step 245) the message, a fourth thread (i.e. Thread 4) is executed within the web browser (110). It should be understood that the fourth thread can also be executed elsewhere on the client computer system (105) or on another computer system associated with the client computer system (105).

Figure 5:
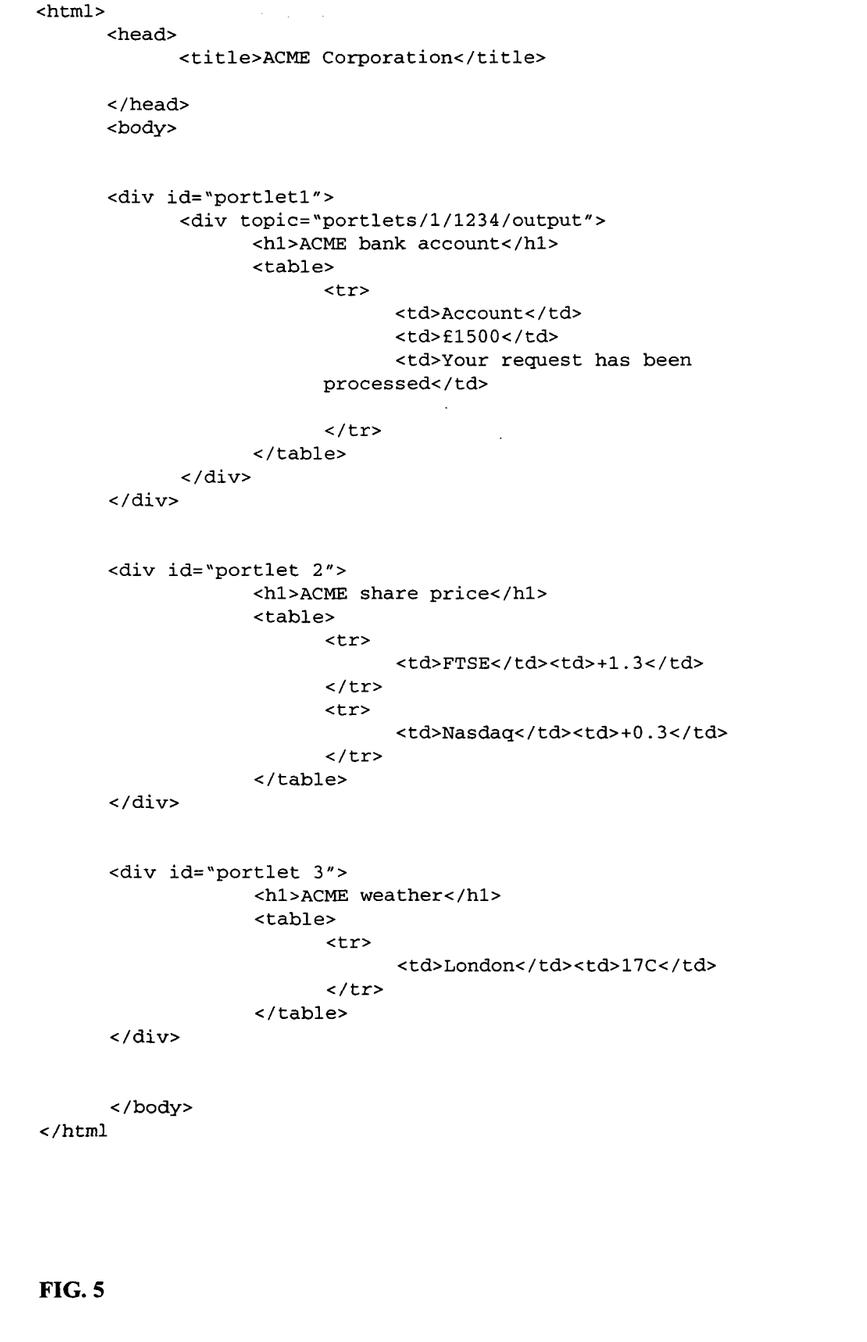
FIG. 5 is an example of a portal page following a publish/subscribe process.

Thread 4 updates (step 250) the portal page for re-rendering. Preferably, Thread 4 parses the message for the message topic (i.e. "portlets/1/1234/output"). Next, Thread 4 parses the portal page for the <DIV> tag associated with the message topic. Next, Thread 4 overwrites the data within the <DIV> tag with the data in the message. The resulting re-rendered portal page is shown in FIG. 5.

Advantageously, the present invention allows for improved response times to a user request. By forcing a completion of the event processing phase (i.e. in response to completion of processing executed by the first thread), the rendering phase can complete and the client computer can render the results for display. In parallel, the actual work of processing the user request is executed (i.e., by the second thread). However, since the event processing phase and rendering phase have already completed, the results from the actual work can be provided to the user at a later time using pub/sub.

Preferably, when topics are created, content fragments that are common to more than one portlet instance are associated with a single topic. For example, a plurality of portlet instances providing content fragments may be associated with a temperature of London. That is, in reference to a determination that content fragments generated by a plurality of portlet instances are identical, a single topic associated with the content fragments is created. At least one subscriber interested in receiving the content fragments associated with the plurality of portlet instances subscribes to the single topic. Thus, there is provided an efficient mechanism of processing requests to a plurality of portlet instances rather than establishing a corresponding plurality of subscriber sessions that then all have to be serviced with the same content fragments. It should be understood that determination of common content fragments can be a manual process wherein determination is executed by a portlet developer. Alternatively, determination of common content fragments can be an automated process, for example, by using statistics of previous requests to multiple instances of a portlet.

What is claimed is:

1. A system for processing a request to a portlet, suitable for use in a network environment, the system comprising:
    a server configured to run one or more portlets,
        the server configured to communicate over a network with a publishing broker,
        the server configured to communicate over a network with a client,
        wherein the server is also configured such that responsive to receiving a request from the client the server invokes an instance of a portlet at the server, the portlet invoked by executing a first thread and a second thread associated with the portlet;
        wherein the first thread generates a container tag for a unique topic, the unique topic associated with the portlet and provided to a second thread,
    wherein the server is also configured to provoke a render phase of the portlet,
    wherein the server is also configured to subscribe a requesting client to receive the unique topic information from a publishing broker rather than the server, the unique topic information to be used by the client for updating topic information from the broker rather than receiving the updated portal page information from the portal application of the server; and
    wherein the second thread is executed in parallel to the first thread.

2. The system as claimed in claim 1, wherein the server or other component further aggregates the data into a portal page and sends the portal page to a second data processing system.

3. The system as claimed in claim 1, wherein the unique topic is associated with at least one content fragment.

4. The system of claim 1 wherein the server is further configured to generate the unique topic.

5. A computer configured to receive and process requests in a network environment, the computer comprising:
   a microprocessor; and
   memory, the memory in communication with the microprocessor and storing instructions, which when executed by the microprocessor configure the computer to comprise:
      a portlet interface for receiving requests from clients for an application maintained by the computer, the portal application including a plurality of portlets that may be invoked; and
      one or more applications that subscribes a requesting client at a publishing broker to receive unique topic information from the publishing broker rather than the computer, the unique topic information for insertion in a placeholder at the client at a subsequent time and without sourcing the unique topic information from the computer.

6. The computer of claim 5, wherein the unique topic information further comprises a content fragment, wherein the content fragment is generated by the portlet.

7. The computer of claim 6 wherein the computer is further configured to render a portal page in response to receiving a portal page comprising the unique topic information.

8. The computer of claim 6, wherein the unique topic is associated with the content fragment.

9. The computer of claim 5 further configured to re-render the portal page with the results in response to receiving the results.

10. A method for processing a request to a portlet over a network, the method comprising the steps of:
    in response to receiving a client request to be serviced by an application using portlets in a portal container at a server, executing a first thread and a second thread associated with one or more portlets;
    wherein the first thread
       generates data comprising a unique topic, wherein the unique topic is associated with the portlet,
       provokes a render phase of the portlet, and
       subscribes the client at a publishing broker to the unique topic,
          the broker publishing to the client, without routing through the server, the unique topic information being sent to the client from the broker and responsive to the client subscription by the first thread to the unique topic,
          the client updating a placeholder at the client with unique topic information received from the publishing broker; and
    wherein the second thread is executed in parallel to the first thread and retrieves results associated with the request to the unique topic and publishes the results at the broker.

11. A method as claimed in claim 10, further comprising the steps of: in response to generation of the content fragment, aggregating the data into a portal page and sending the portal page to a second data processing system.

12. A method as claimed in claim 10, wherein the unique topic is associated with the content fragment and wherein the subscription of the client requestor at the publisher broker is made without first receiving a subscription request from the client.

13. A method as claimed in claim 10, further comprising the step of generating the unique topic.

14. A method for receiving results associated with a request to a portlet suitable for use with an environment comprising a data processing system having one or more portlets and a publishing broker, the method comprising the steps of:
    sending a client request to the portlet;
    in response to receiving data comprising a unique topic, wherein the unique topic is associated with the portlet, sending the received data and subscribing the client at the broker to the unique topic, the subscription made by a server and made without requiring a subscription request from the client to the server for the unique topic; and
    receiving at the client, unique topic results associated with the client request, through the subscription made by the server, wherein the results are published to the unique topic at the broker and flow from the broker to the subscribed client without passing through the server.

15. A method as claimed in claim 4, wherein the data further comprises a content fragment, wherein the content fragment is generated by the portlet.

16. A method as claimed in claim 5, further comprising the step of: in response to receiving a portal page comprising the data, rendering the portal page.

17. A method as claimed in claim 15, wherein the unique topic is associated with the content fragment.

18. A non-transitory computer program product for processing a request to a portlet, suitable for use with an environment comprising a first data processing system having one or more portlets and a publish broker, the computer program product comprising a computer readable storage device having computer readable program code tangibly embedded therein, the computer readable program code comprising:
    computer readable program code configured to receive a client request to the portlet;
    computer readable program code configured to, in response to receiving data comprising a unique topic, wherein the unique topic is associated with the portlet, rendering the received data and subscribe the client at the broker for the unique topic, the subscription of the client made without requiring a subscription request from the client; and
    computer readable program code configured to receive results associated with the request, through the subscription of the client, wherein the results are published to the unique topic by the broker and are provided to the client by the broker without passing through the server for use in a placeholder at the client after event processing and rendering phases are completed with regard to the portlet requested by the client.

* * * * *